April 25, 1933.   G. J. RUSSELL   1,905,509
BROACHING GUIDE
Filed Jan. 30, 1930
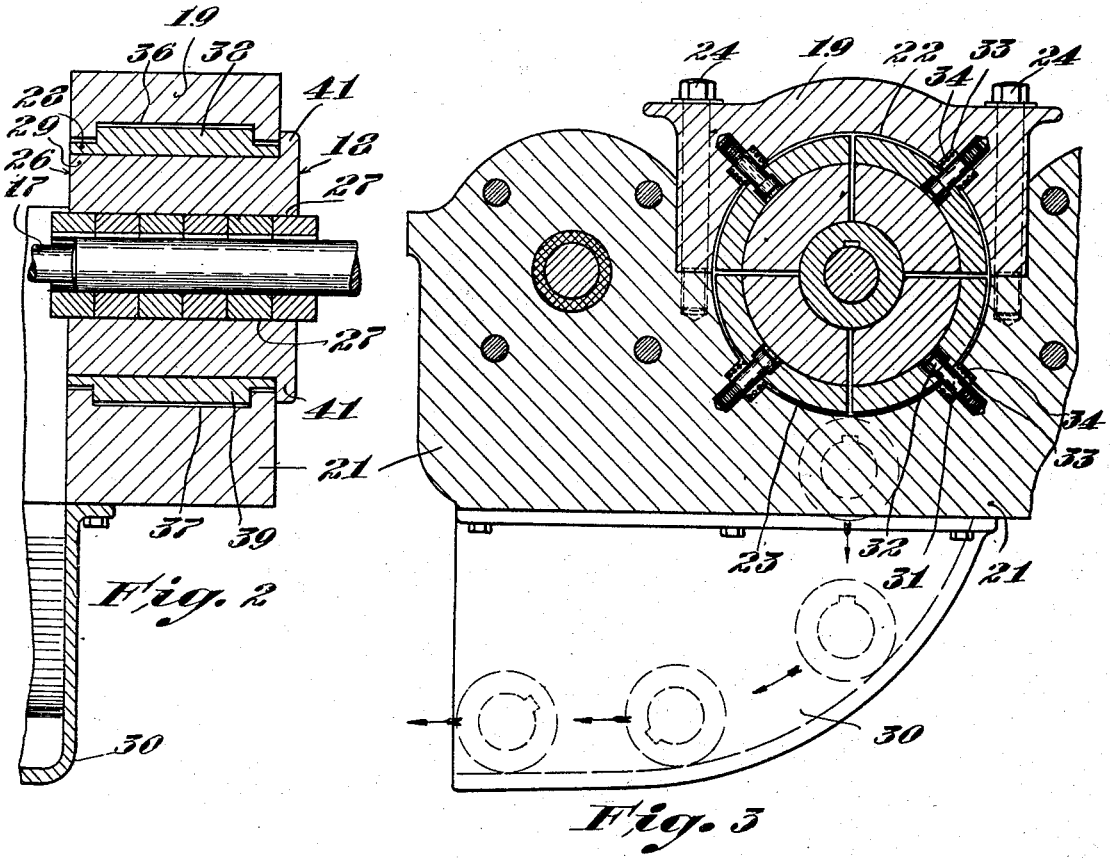
Fig. 2
Fig. 3
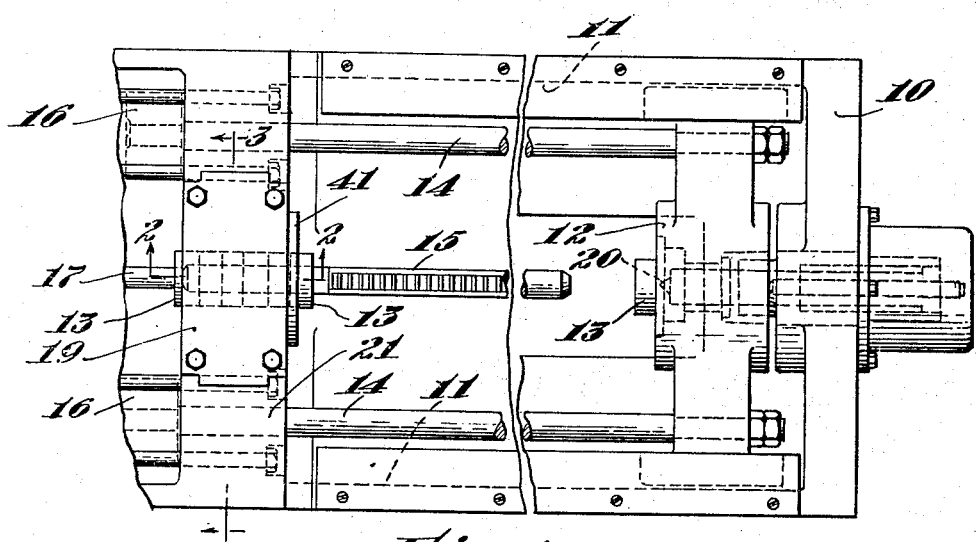
Fig. 1
Inventor
George J. Russell
by Roberts, Cushman & Woodbury
his Attorneys Patented Apr. 25, 1933

1,905,509

UNITED STATES PATENT OFFICE

GEORGE J. RUSSELL, OF WALTHAM, MASSACHUSETTS

BROACHING GUIDE

Application filed January 30, 1930. Serial No. 424,560.

This invention relates to broaching and to broaching machines of the type in which the rear end of the broach is supported in previously broached stock, the stock being advanced through an external guide or supporting chamber as successive pieces of stock are received from the broach. This external guide or supporting chamber has heretofore been provided with relatively rigid, non-yieldable guiding surfaces as these have been considered necessary for guiding the stock and for enabling the latter to support the broach. It not infrequently happens that pieces of broached stock, as castings or forgings, for example, have irregularities on their exterior surfaces, or for some other reason fail to conform precisely to the contour of this guiding chamber. In such cases difficulties are encountered as the stock may fit loosely at some points while others may rub and injure the guiding surfaces, or again a piece of stock as a whole may be too large or too small for the guide.

Objects of the present invention are to improve the construction of broaching apparatus of the class described so as to overcome the above mentioned difficulties; to provide a yieldable support for the rear end of a broaching tool; to provide an expansible and contractible stock receiving guide; to provide a stock receiving guide having relatively rigid guiding surfaces capable of unequal expansion along different radii of the guide; to provide a stock receiving guide having relatively rigid guiding surfaces capable of simultaneous expansion and contraction along different radii; and also to provide a stock receiving guide of simple, efficient, yet rugged and durable construction.

According to the present invention a guide of the class described may be formed of a number of members arranged to define a stock receiving passage and mounted for radial movement relative to the enclosed passage. Resilient means such as springs may be arranged to act independently on the members defining the passage so as to tend to urge these members inwardly. Each of these members is then capable of movement independently of the others and hence it is assured that the passage will fit closely about pieces of stock having irregularities only about a portion of their peripheries. The passage is also expansible and contractible to receive stock which may be over or under the standard size.

In the drawing:

Fig. 1 is a top plan view of a portion of a broaching machine; and

Figs. 2 and 3 are respectively sections taken substantially along the lines 2—2 and 3—3 of Fig. 1.

Apparatus selected for illustrating the features of the present invention comprises a broaching machine having a framework or bed plate 10 provided at the sides thereof with longitudinally disposed guideways 11 in which the cross-head or stock carrier 12 is mounted for reciprocatory motion for advancing stock 13 over the broaching tool 15. A reciprocatory motion is imparted to this cross-head through piston rods 14 which are connected to the cross-head 12 and which are also connected to pistons (not shown) operating in the horizontal cylinders 16. During the broaching operation, while the stock carrier 12 is advanced from right to left, as shown in Fig. 1, the rear end of the broaching tool engages an abutment 17 (Figs. 1 and 2) which is held in fixed position during the advance of the stock carrier but which is movable out of engagement with the broach to permit removal of previously broached pieces of stock, all as fully set forth in my prior Patent No. 1,481,437. The front-center 20 may also be advanced to engage the front end of the broaching tool 15 during the advance of the stock carrier, although the use of this front-center is not essential to the practice of the present invention.

When the broaching operation is completed, the movable abutment is withdrawn from engagement with the broach and the stock carrier is returned to its withdrawn position, or to the right as shown in Fig. 1. During the aforesaid advance movement of the stock carrier the pieces of stock on the rear end of the broach are all advanced so that the forward piece is moved off from the broach, and on to the abutment rod 17. As the abutment is withdrawn the forward piece falls from the abutment into the discharge chute 30. The broach is supported in previously broached pieces of stock 13, as illustrated in Fig. 2, and these pieces of stock are slidably supported in an external guide 18, being advanced progressively through the guide as successive pieces of stock are advanced by the stock carrier from the broach to the guide. As these pieces of stock sometimes have irregularities on their exterior surfaces, it will be evident that difficulties will be encountered if such pieces are received in a guide having rigid non-yieldable guiding surfaces. To overcome difficulties of this nature and to improve the construction of the apparatus, the external guide is mounted in upper and lower support members 19, 21 having registering opposed substantially semi-cylindrical recesses, 22, 23, the upper member preferably being in the form of a cap which is releasably secured to the lower member by means of bolts 24 extending through the cap and engaging tapped and threaded holes in the lower member. This lower member is disposed transversely of the frame and rigidly connected thereto.

The external guide is composed of a number of elongate members 26 preferably segmental in cross section and disposed longitudinally within the semi-cylindrical recesses 22, 23 in the upper and lower support members. The inner longitudinal walls 27 of these elongate members are shaped to conform substantially to the external contour of the stock 13 to be broached, which in the present instance is cylindrical, and these interior longitudinal walls thus define a guiding passage of substantially uniform cross section. The segmental members are also preferably composed of outer lining segments 28 which are united to inner stock engaging segments 29 in any approved manner, as by means of screws (not shown). Previous to uniting these parts, the lining segments are bored at circumferentially spaced points to receive slidably the shanks of studs 31 affixed to the support members and projecting into the semi-cylindrical recesses 22, 23. The inner ends of the holes formed in the lining segments are also counterbored slidably to receive the heads 32 of these studs. The support members have counter-bores 33 concentric with the respective studs in which coil springs 34 are disposed about the studs for urging the segmental members inwardly. It will be seen that the cylindrical recess defined by the upper and lower support members 19, 21 limits the expansion of the individual stock engaging members, and that the studs 31 serve as radial guides for guiding the stock engaging segments inwardly and outwardly, inward movement of these segments being limited by the heads on the studs. Each of the stock engaging segments is thus movable independently of the other, so that the guiding passage defined by the inner longitudinal walls 27 of these segments is capable of simultaneous expansion and contraction along radii taken through the different segments and likewise this passage is capable of different degrees of expansion along radii taken through the different segments.

The upper and lower support members 19, 21 have annular recesses or counterbores 36, 37 extending through the intermediate portions thereof and terminating adjacent the ends of these members. The lining segments also have peripheral enlargements or abutments 38, 39 which are complementary to these annular recesses and fit slidably therein, thereby assisting in securing the segmental members against longitudinal movement relative to the support members. The ends of the stock engaging segments at the receiving end of the guide have outwardly directed flanges 41 adapted to overlie the support members and to transmit thereto the thrust received by the stock engaging segments during the advance of pieces of stock through this external guide.

I claim:

1. In a broaching machine of the class described, the combination of an external guide for receiving stock from the broach and for supporting the stock with an end of the broach disposed therein, said external guide comprising members segmental in section and arranged with their longitudinal edges adjacent, means for urging the members inwardly, and means for supporting the members in position longitudinally of the broach.

2. In a broaching machine of the class described, the combination of an external guide for receiving stock from the broach and for supporting the stock with an end of the broach disposed therein, said external guide comprising elongate members disposed side by side with their longitudinal edges adjacent and arranged substantially to enclose a space having approximately the same contour as the stock to be received, and means for yieldably supporting the elongate members.

3. In a broaching machine of the class described, the combination of an external guide for receiving stock from the broach and for supporting the stock with an end of the broach disposed therein, said external guide comprising a series of longitudinally disposed members arranged side by side substantially to enclose a space having substantially uniform cross-sectional area from end to end, means for guiding the members for movement transversely of the enclosed space for varying the dimensions of the latter, and means for urging the members inwardly.

4. In a broaching machine of the class described, the combination of an external guide for receiving stock from the broach and for supporting the stock with an end of the broach disposed therein, said external guide comprising pairs of opposed members arranged substantially to enclose an elongate space having a substantially uniform cross section from end to end, means for guiding the members of each pair for inward and outward movement substantially along one diameter, and yieldable means associated with each member independently for urging the members inwardly.

5. In a broaching machine of the class described, the combination of an external guide for receiving stock from the broach and for supporting the stock with an end of the broach disposed therein, said external guide comprising a support having a passage therein, guide members affixed to the support and extending into the passage, elongate members in engagement with the guide members and having inner longitudinal walls defining a guide passage of substantially uniform cross section, and resilient means for urging the elongate members inwardly.

6. In a broaching machine of the class described, the combination of an external guide for receiving stock from the broach and for supporting the stock with an end of the broach disposed therein, said external guide comprising a support having a substantially cylindrical opening therein, elongate members disposed longitudinally within the cylindrical opening and having arcuate outer longitudinal walls substantially fitting the cylindrical opening, the elongate members having inner longitudinal walls arranged to define a passage of substantially uniform cross section, guide members projecting radially into the cylindrical opening, the elongate members having openings in which the guide members are slidably received, and means for urging the elongate members inwardly.

7. In a broaching machine of the class described, the combination of an external guide for receiving stock from the broach and for supporting the stock with an end of the broach disposed therein, said external guide comprising upper and lower support members having registering and opposed substantially semi-cylindrical openings therein, releasable means for holding the upper and lower support members together, circumferentially spaced guides projecting into the semi-cylindrical openings of the upper and lower support members, elongated members disposed longitudinally about the periphery of the semi-cylindrical openings and having holes in which the guides are slidably received, and springs disposed about each guide for urging the elongate members inwardly.

8. The combination as set forth in claim 5, and outwardly directed flanges on one end of the elongate members, said flanges extending outwardly beyond the passage in the support for engaging the support to hold the elongate members in position longitudinally thereof.

9. In a broaching machine of the class described, the combination of an external guide for receiving stock from the broach and for supporting the stock with an end of the broach disposed therein, said external guide comprising a support having a passage therein, circumferentially spaced studs affixed to the support and projecting into the passage, heads on the projecting ends of the studs, elongate members disposed longitudinally within the passage and having inner longitudinal walls enclosing a space of substantially uniform cross section, the elongate members having holes slidably receiving the studs, the inner ends of the holes being counterbored slidably to receive the heads of the studs, and springs disposed about the studs for urging the elongate members inwardly.

10. In a broaching machine of the class described, the combination of an external guide for receiving stock from the broach and for supporting the stock with an end of the broach disposed therein, said external guide comprising a transverse support having a longitudinal passage therethrough, the passage having an annular recess formed in the walls thereof and spaced from the ends of the passage, longitudinally disposed members having complementary enlargements substantially fitting the annular recess, the inner longitudinal walls of the longitudinally disposed members defining a stock receiving space of substantially uniform cross section, and means for yieldably supporting the longitudinally disposed members.

11. In a broaching machine of the class described, the combination of an external guide for receiving stock from the broach and for supporting the stock with an end of the broach disposed therein, said external guide comprising a transverse support having a longitudinal bore extending therethrough, said bore leaving a counterbore extending through the intermediate portion thereof, members disposed longitudinally within the bore and having complementary enlargements substantially fitting the counterbore, the inner longitudinal walls of the members defining a stock receiving space of substantially uniform cross section, and resilient means associated with each member independently for urging the members inwardly.

12. The combination as set forth in claim 11, and outwardly disposed flanges on one end of said members, said flanges extending beyond the bore into engagement with the support for holding said members against longitudinal movement.

13. In a broaching machine of the class described, the combination of an external guide for receiving stock from the broach and for supporting the stock with an end of the broach disposed therein, said external guide comprising a support having a passage therein, elongate members disposed longitudinally within the passage, complementary interfitting abutments on the elongate members and in the passage for holding the elongate members from longitudinal movement, the inner longitudinal walls of the elongate members defining a stock receiving space of substantially uniform cross section, and means for yieldably supporting the elongate members.

14. In a broaching machine of the class described, the combination of means for supporting a broach and centering pieces of stock thereon, said means comprising opposed walls movable toward and from each other and engageable with pieces of stock on the broach to provide an expansible and contractible external guide, the opposed walls being positioned to receive stock moving axially along the broach, and means for holding the guide in position longitudinally of the broach.

15. In a broaching machine of the class described, the combination of means for supporting a broach and centering pieces of stock thereon, said means comprising opposed walls movable toward and from each other and engageable with pieces of stock on the broach to provide an expansible and contractible external guide, the opposed walls being positioned to receive stock moving axially along the broach, means for limiting expansion of the guide, and means for supporting the guide in position longitudinally of the broach.

16. In a broaching machine of the class described, the combination of means for supporting a broach and centering pieces of stock thereon, said means comprising opposed walls movable toward and from each other and engageable with pieces of stock upon the broach to provide an expansible and contractible external guide for receiving stock moving along the broach, the longitudinal axis of the guide substantially coinciding with the longitudinal axis of the broach, means for limiting contraction of the guide, and means for supporting the guide in position longitudinally of the broach.

17. In a broaching machine of the class described, the combination of means for supporting a broach and centering pieces of stock thereon, said means comprising an expansible and contractible external guide for receiving stock from the broach and supporting the latter through the medium of said stock, means providing for simultaneous and unequal expansion along different diameters of the guide, and means for maintaining the guide in position longitudinally of the broach.

18. In a broaching machine of the class described, the combination of means for supporting a broach and centering pieces of stock thereon, said means comprising an expansible and contractible guide providing a passage substantially coaxial with the broach for receiving and supporting stock on the broach and supporting the latter through the medium of such stock, means providing for simultaneous expansion and contraction along different diameters of the guide, and means for supporting the guide in position longitudinally of the broach.

19. In a broaching machine of the class described, the combination of means for supporting a broach and centering pieces of stock thereon, said means comprising a circumferential row of members disposed longitudinally of the broach, said members being engageable with pieces of stock on said broach for centering such pieces of stock and for supporting the broach through the medium of such stock, said members defining a guiding passage having open ends through which stock may pass in moving along the broach, means for urging said members inwardly, and means for holding said members in position longitudinally of the broach.

20. In a broaching machine of the class described, the combination of means for supporting a broach and centering pieces of stock thereon, said means comprising a circumferential row of members disposed longitudinally of the broach, said members being engageable with pieces of stock on said broach for centering such pieces of stock and for supporting the broach through the medium of such stock, said members defining a guiding passage having open ends through which stock may pass in moving along the broach, resilient means associated with each member independently for urging said members inwardly, and means for holding said members in position longitudinally of the broach.

Signed by me at Boston, Massachusetts, this 27th day of January, 1930.

GEORGE J. RUSSELL.